United States Patent

Kinoshita et al.

[11] Patent Number: 6,114,951
[45] Date of Patent: Sep. 5, 2000

[54] VEHICLE COLLISION PREVENTING APPARATUS

[75] Inventors: Masahiro Kinoshita, Ota; Atsushi Ikeda, Ashikaga, both of Japan

[73] Assignee: Fuji Jukogyo Kabushiki Kaisha, Tokyo, Japan

[21] Appl. No.: 08/992,605

[22] Filed: Dec. 17, 1997

[30] Foreign Application Priority Data

Dec. 27, 1996 [JP] Japan .................................. 8-350441

[51] Int. Cl.[7] .................................................. B60Q 1/00
[52] U.S. Cl. ..................... 340/436; 340/901; 340/903; 340/904; 340/435
[58] Field of Search ................................. 340/901, 903, 340/904, 935, 436, 437; 348/149; 701/301, 70, 77, 78, 79, 80, 93, 96

[56] References Cited

U.S. PATENT DOCUMENTS

| | | | |
|---|---|---|---|
| 5,189,619 | 2/1993 | Adachi et al. | 340/903 X |
| 5,357,438 | 10/1994 | Davidian | 180/169 X |
| 5,477,461 | 12/1995 | Waffler et al. | 180/169 X |
| 5,617,199 | 4/1997 | Dunne | 356/5.01 |
| 5,710,565 | 1/1998 | Shirai et al. | 342/70 |

OTHER PUBLICATIONS

Journal of The Society of Automotive Engineers of Japan vol. 43, No. 2, 1989, "Rear–end Collision Warning System using Laser for Heavy–duty Trucks", Yasuma et al.

*Primary Examiner*—Daryl Pope
*Attorney, Agent, or Firm*—Martin A. Farber

[57] ABSTRACT

A collision preventing apparatus of a vehicle for preventing a collision with a preceding vehicle running ahead of the vehicle has an image processor and a computer for calculating inter-vehicle distance, an inter-vehicle distance between the vehicle and the preceding vehicle, and a safe-inter vehicle distance between the vehicle and the preceding vehicle while observing a third vehicle running ahead of the preceding vehicle, judging a hazard of collision with the preceding vehicle based on the inter-vehicle distance and the safe inter-vehicle distance, and warning a driver of the hazard. Since the vehicle having the collision preventing apparatus runs calculating the inter-vehicle distance in conjunction with the third vehicle, a collision with the preceding vehicle can be prevented, even when a driver of the preceding vehicle applies an emergency brake to avoid a collision with the third vehicle running ahead of the preceding vehicle.

3 Claims, 6 Drawing Sheets

VEHICLE COLLISION PREVENTING APPARATUS

BACKGROUND OF THE INVENTION

1. Field of the Invention

The present invention relates to a vehicle collision preventing apparatus in which an obstacle is detected in a traveling direction of the vehicle and a judgment is made as to whether or not an own vehicle collides against the obstacle.

2. Prior Art

Recently, various approaches for safe driving have been attempted. One of these approaches is the development of an ASV (Advanced Safety Vehicle). The ASV includes techniques such as issuing alarm to a vehicle driver, stopping a vehicle by braking automatically, changing vehicle speeds automatically so as to maintain a proper inter-vehicle distance and the like by detecting obstacles ahead of the vehicle with TV cameras or laser beam-radar apparatus and the like and judging a possibility of collision with the obstacles.

As an example of this kind of technology, Journal of The Society of Automotive Engineers of Japan Vol. 43, No. 2, 1989, an article "Rear-end Collision Warning System using Laser for Heavy-duty Trucks" discloses a technology in which a vehicle speed of the preceding vehicle and a relative vehicle speed of the subject vehicle with respect to the preceding vehicle are calculated based on a vehicle speed of the subject vehicle and a distance between the subject vehicle and the preceding vehicle detected by a laser beam radar, and when the distance between two vehicles comes within a safe inter-vehicle distance calculated based on this relative vehicle speed, an alarm is sent out to warn a possible collision against the preceding vehicle.

However, this warning system is still insufficient because hazard is judged by observing only the preceding vehicle or only an obstacle ahead of the subject vehicle without taking other situations ahead of the preceding vehicle into consideration.

Assuming such a situation that the preceding vehicle comes to a sudden stop to avoid a collision with an obstacle, it is necessary to raise an alarm with a sufficient time margin. This requires to establish a very large inter-vehicle distance which may allow other vehicles to cut in between the subject vehicle and the preceding vehicle.

Further, since such a safe driving technique as noticing only the behavior of the preceding vehicle is fundamentally based on an assumption that the driver of the preceding vehicle always takes a reasonable behavior, it is impossible to expect a further safe driving.

SUMMARY OF THE INVENTION

Accordingly, the present invention is intended to obviate the disadvantages of the known arts.

It is an object of the present invention to provide a collision preventing apparatus capable of avoiding a collision with a preceding vehicle by watching not only an inter-vehicle distance between the self vehicle and the preceding vehicle but also an inter-vehicle distance between the self vehicle and a third vehicle running ahead of the preceding vehicle. In order to attain the object, the present invention comprises:

inter-vehicle distance calculating means for calculating an inter-vehicle distance between the self vehicle and the preceding vehicle;

safe inter-vehicle distance calculating means for calculating a safe-inter vehicle distance between the self vehicle and the preceding vehicle in conjunction with an inter-vehicle distance between the self vehicle and the third vehicle running ahead of the preceding vehicle; and hazard judging means for judging a hazard of collision with the preceding vehicle based on the inter-vehicle distance and the safe inter-vehicle distance.

BRIEF DESCRIPTION OF THE DRAWINGS

Preferred embodiments will be described with reference to accompanying drawings in which.

DETAILED DESCRIPTION OF PREFERRED EMBODIMENTS

Figure 1:
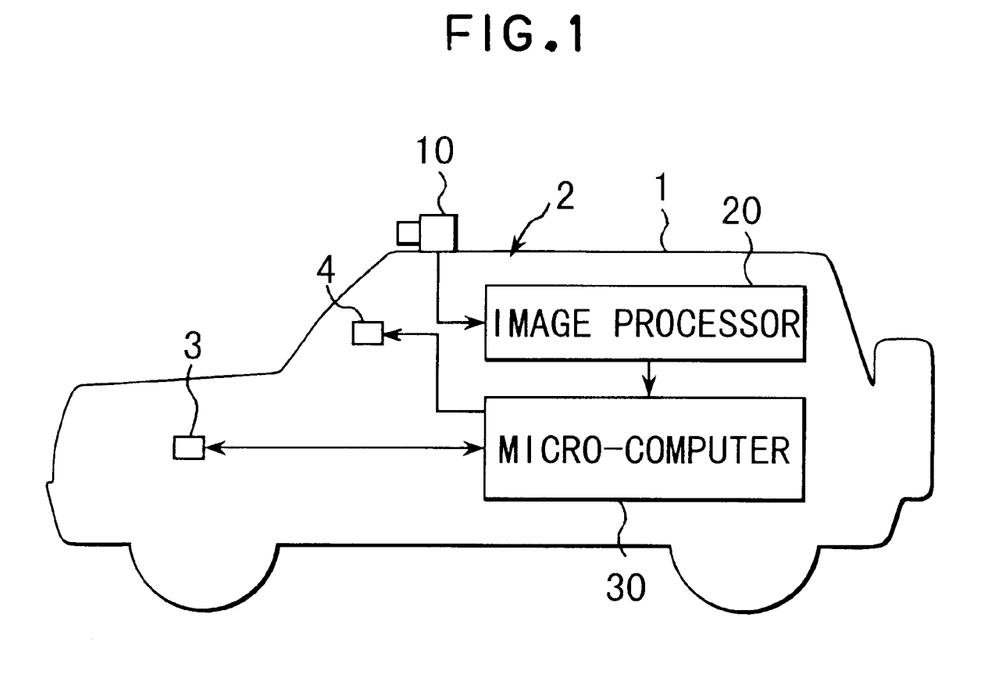
FIG. 1 is a schematic view of a collision preventing apparatus according to a first embodiment of the present invention.

Referring now to FIG. 1, numeral 1 denotes a vehicle on which a collision preventing apparatus 2 is mounted in order to recognize an obstacle, a vehicle existing ahead of the subject vehicle or a next preceding vehicle which exists ahead of that preceding vehicle, to judge an impeding collision with those vehicles and to raise a warning.

The collision preventing apparatus 2 comprises a stereoscopic optical system 10 for imaging pictures of objects from two different positions, an image processor 20 for calculating three-dimensional distance distributions over an entire image of a pair of stereoscopic pictures taken by the stereoscopic optical system 10 according to a principle of triangulation, and a micro-computer 30 for processing distance distributions data sent from the image processor 20, for recognizing the shape of a road or a plurality of solid objects, for integratedly judging hazard with respect to a plurality of obstacles such as a preceding vehicle, a next preceding vehicle and the like and for warning a driver of an impending collision. Further, the micro-computer 30 is connected with sensors for detecting present vehicle running conditions such as a vehicle speed sensor 3 and the like and also connected with a warning device 4 composed of a buzzer, a display and the like.

Figure 2:
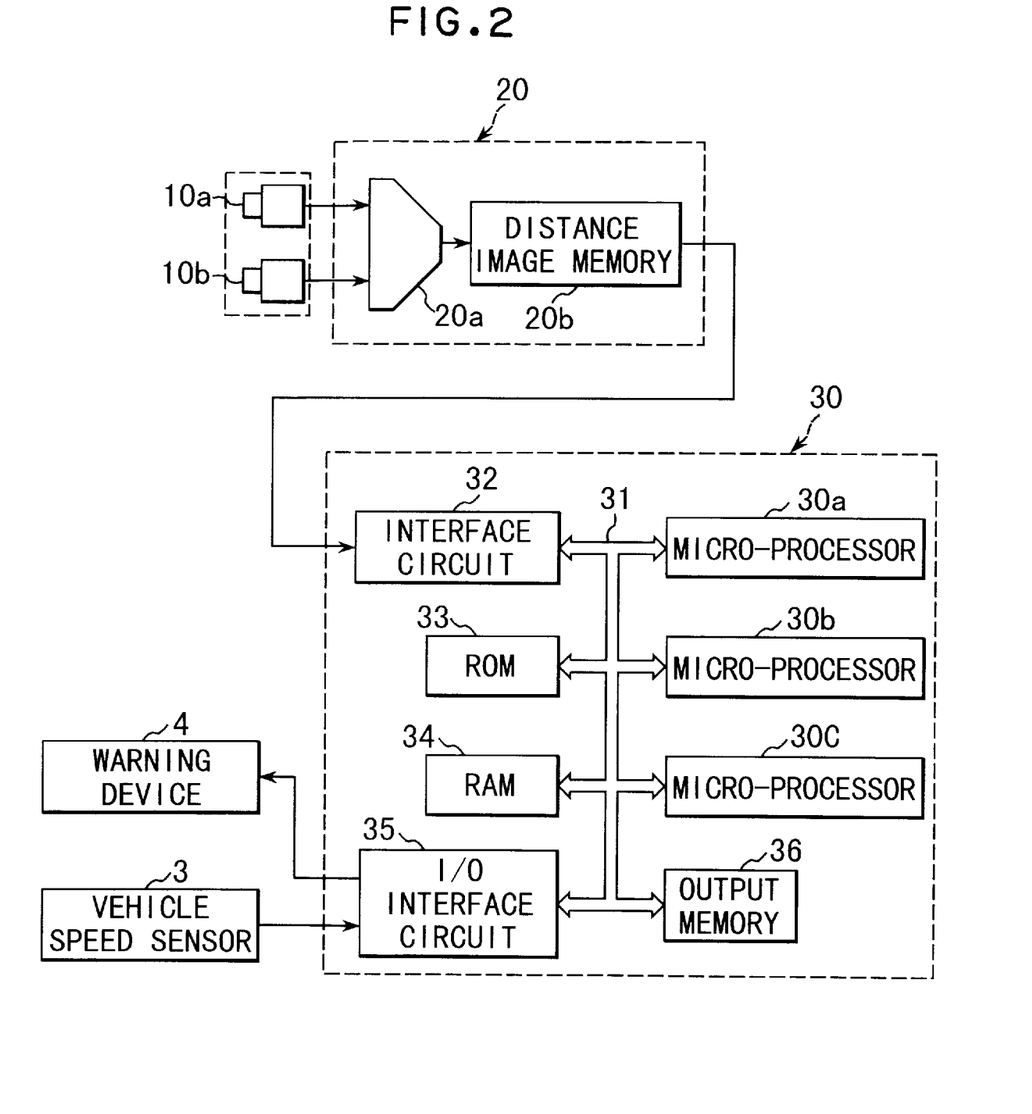
FIG. 2 is a block diagram of a collision preventing apparatus according to a first embodiment of the present invention.

As shown in FIG. 2, the stereoscopic optical system 10 is composed of a pair of left and right CCD cameras 10*a*, 10*b* using a solid-state image component such as a Charge Coupled Device (CCD). These CCD cameras 10*a*, 10*b*, as shown in FIG. 1, are disposed one for each on the left and right sides of the front roof of the vehicle 1 so as to be able to take an extensive view of objects ahead of the preceding vehicle as well as ahead of the self vehicle.

The image processor 20, as shown in FIG. 2, comprises a distance detecting circuit 20*a* and a distance image memory 20b. In the distance detecting circuit 20a, a small region imaging the same object is searched from two stereoscopic pictures taken by the stereoscopic optical system 10, respectively and the distance to the object is calculated from the amount of deviation between these two small regions. In the distance image memory 20b, distance distributions data having a form of the image picture are memorized.

Further, the micro-computer 30 comprises a micro-processor 30a whose function is mainly to detect configurations of roads, a micro-processor 30b whose function is mainly to detect solid objects, a micro-processor 30c whose function is to judge hazard of an impending collision with the preceding vehicle, and a bus line 31 connected in parallel with these micro-processors 30a, 30b, 30c.

Further, within the micro-computer 30, the bus line 31 is connected with an interface circuit 32 which is connected to the distance image memory 20b, a ROM 33 for storing a control program, a RAM 34b for memorizing miscellaneous parameters needed for calculations, an input-and-output (I/O) interface which is connected to the vehicle speed sensor 3 and the warning device 4, and an output memory 36.

In the micro-processor 30a for detecting configurations of roads, first actual lane markers of a road are extracted from three-dimensional positional information contained in the distance image which is stored in the distance image memory 20b and then the configuration of the road is recognized by modifying a road model stored therein based on the actual lane markers.

Further, in the micro-processor 30b for detecting objects, objects on a road are detected as follows:

First, the distance image is divided into a plurality of three-dimensional lattices and only solid objects data having a possibility of obstructing the running of the subject vehicle are selected from respective lattices. Then, distances to the objects are calculated. If the difference of the detected distance to two adjacent objects is smaller than a specified value, these two objects are deemed as the same object. On the other hand, if the difference of the detected distance to two adjacent objects is larger than a specified value, these two objects are deemed as the different objects, respectively. Thus, repeating these processes, an outline of the detected object is extracted.

The formation of the distance image by the image processor 20 and the processes of detecting the road configuration and objects by the micro-processors 30a, 30b are described in detail in Japanese Patent Applications Laid-open Toku-Kai-Hei 5-265547 and Toku-Kai-Hei 6-177236 filed by the inventor of the present invention.

Further, in the micro-processor 30c for judging hazard of an impending collision with the preceding vehicle, first a safe inter-vehicle distance between the subject vehicle and the preceding vehicle is calculated, and when the inter-vehicle distance becomes smaller than a safe inter-vehicle distance, an alarm is outputted to the warning device 4. Further, according to the present invention, in addition to this, in case where a next preceding vehicle exists ahead of the preceding vehicle, the safe inter-vehicle distance between the subject vehicle and the preceding vehicle is calculated taking an inter-vehicle distance or a relative vehicle speed between the subject vehicle and the next preceding vehicle into consideration. In this case, when the inter-vehicle distance between the subject vehicle and the preceding vehicle becomes smaller than a safe inter-vehicle distance, the warning device 4 raises an alarm to urge the driver to apply brakes (not shown). Thus, the subject vehicle can secure a safe driving, even when the next preceding vehicle applies an emergency brake. Further, this function can be more effective by interlocking the warning device with an automatic brake apparatus (not shown)and the like.

Next, the collision preventing process of the micro-processor 30 will be described according to a flowchart shown in FIG. 3.

Figure 3:
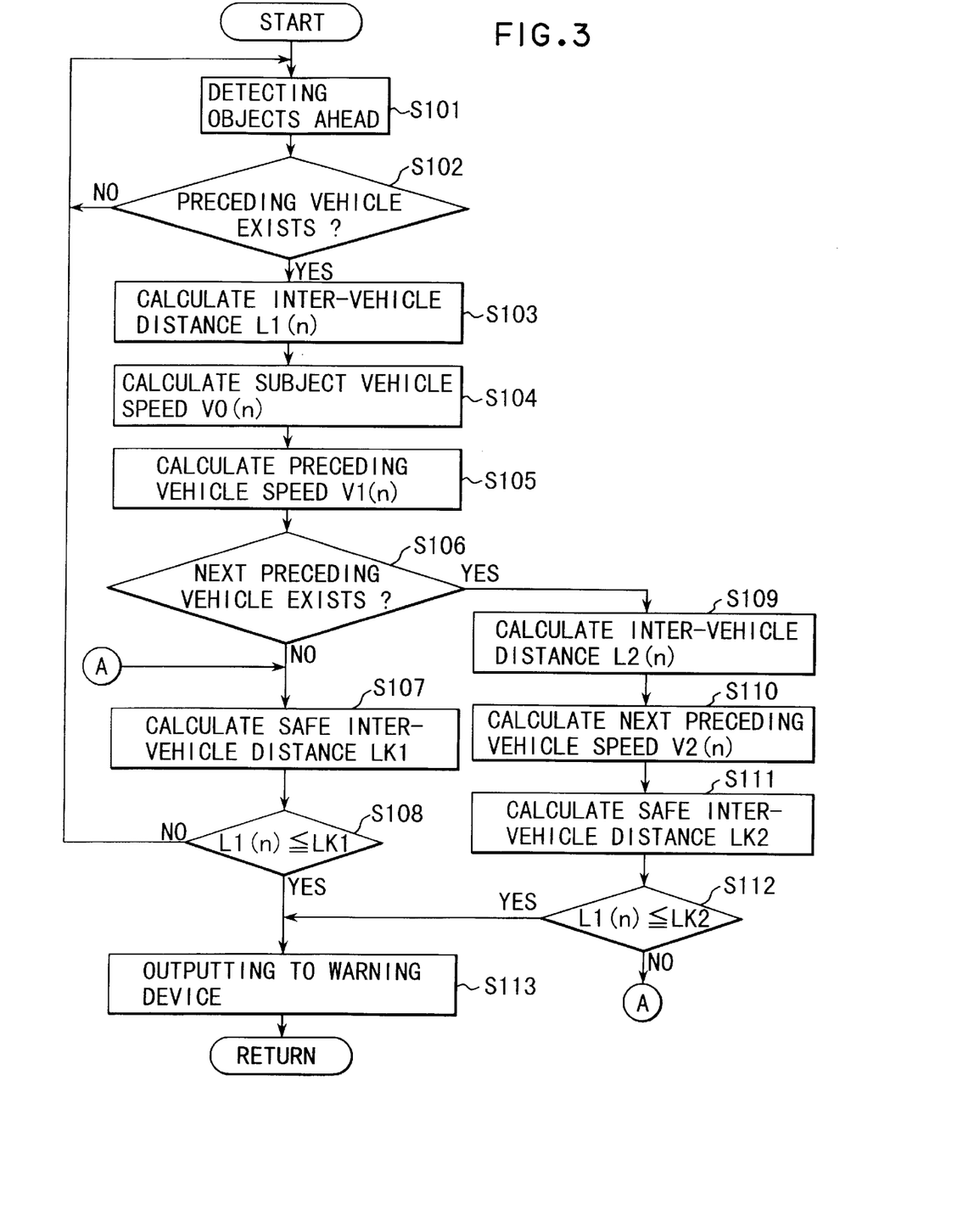
FIG. 3 is a flowchart showing a flow of control of a collision preventing apparatus according to a first embodiment of the present invention.

Referring to FIG. 3, the subject vehicle 1 runs after the preceding vehicle 50 with an inter-vehicle distance L1 and further a next preceding vehicle 100 runs ahead of the subject vehicle with an inter-vehicle distance L2. In this example, the next preceding vehicle may be replaced with a parked vehicle or may be a pedestrian walking across the road.

At a step S101, the data of solid objects extracted from the distance image are read and at a step S102 (hereinafter referred to as "S number") it is checked whether or not a preceding vehicle exists in the running direction of the vehicle. If there is no preceding vehicle, the program returns to S101 and if a preceding vehicle exists, the program goes to S103 where the inter-vehicle distance $L1_{(n)}$ between the subject vehicle and the preceding vehicle is calculated. The previously calculated inter-vehicle distance is stored as $L1_{(n-1)}$. Here, the subscript (n) indicates a presently obtained value and the subscript (n−1) depicts a previously obtained value.

Next, the program goes to S104 where a vehicle speed V0 of the subject vehicle 1 is calculated. Then, at S105 a vehicle speed $V1_{(n)}$ of the preceding vehicle 50 is calculated according to the following equation based on a time-versus change of the present inter-vehicle distance $L1_{(n)}$ with respect to the previous inter-vehicle distance $L1_{(n-1)}$ and the present vehicle speed $V0_{(n)}$ of the subject vehicle 1:

$$V1_{(n)}=(L1_{(n)}-L1_{(n-1)})/\Delta t+V0_{(n)} \qquad (1)$$

where $\Delta t$ is a time interval for measurement and calculation.

After that, the program goes to S106 where it is checked from the data of extracted solid objects whether or not a next preceding vehicle exists. If there is no next preceding vehicle, the program goes from S106 to S107 where a safe inter-vehicle distance LK1 between the subject vehicle and the preceding vehicle is calculated The safe inter-vehicle distance LK1 is calculated according to the following equation:

$$LK1=-V1_{(n)}^2/(2\cdot\alpha_{k11})+V0_{(n)}^2/(2\cdot\alpha_{k0})+V0_{(n)}\cdot T1+L0 \qquad (2)$$

where $\alpha_{k11}$ is a deceleration of the preceding vehicle when the preceding vehicle applies a brake, $\alpha_{k0}$ is a deceleration of the subject vehicle when the subject vehicle applies a brake to avoid collision, T1 is a dead time of the subject vehicle and L0 is a space margin between both vehicles after both stop. In the equation (2) the paragraph "$V1_{(n)}^2/(2\cdot\alpha_{k11})$" is a braking distance of the preceding vehicle when the preceding vehicle is braked with a deceleration $\alpha_{k11}$ at the vehicle speed $V1_{(n)}$ and the paragraph "$V0_{(n)}^2/(2\cdot\alpha_{k0})$" is a braking distance of the subject vehicle when the subject vehicle is braked with a deceleration $\alpha_0$ at the vehicle speed $V1_{(n)}$.

The deceleration $\alpha_{k11}$ is a value which has been established beforehand based on the assumption that the precedent vehicle will apply an emergency brake and the deceleration $\alpha_{k0}$ is a value which has been established in consideration of the brake efficiency of the subject vehicle. Further, the dead time T1 is determined taking a driver's response time into consideration. The space margin L0 maybe determined in accordance with the magnitude of deceleration, for example, establishing the space margin so as to be larger as deceleration becomes large.

After the safe inter-vehicle LK1 is calculated at S107, the program goes to S108 where the safe inter-vehicle distance LK1 is compared with the present inter-vehicle distance $L1_{(n)}$. If the present inter-vehicle distance $L1_{(n)}$ is larger than the safe inter-vehicle distance LK1, the program returns to S101. If the present inter-vehicle distance $L1_{(n)}$ is smaller than or equal to the safe inter-vehicle distance LK1, the program goes to S113 where a warning signal is outputted to the warning device 4 to warn the vehicle driver of an imminent collision, and then the program leaves the routine.

On the other hand, if it is judged at S106 that a next preceding vehicle exists, the program skips to S109 where an inter-vehicle distance $L2_{(n)}$ between the next preceding vehicle and the subject vehicle is calculated. Then, at S110, a vehicle speed $V2_{(n)}$ of the next preceding vehicle 100 is calculated according to the following equation based on a time-versus change of the present inter-vehicle distance $L2_{(n)}$ with respect to the previous inter-vehicle distance $L2_{(n-1)}$ and the present vehicle speed $V0_{(n)}$ of the subject vehicle 1:

$$V2_{(n)}=(L2_{(n)}-L2_{(n-1)})/\alpha t+V0_{(n)} \quad (3)$$

Figure 4:
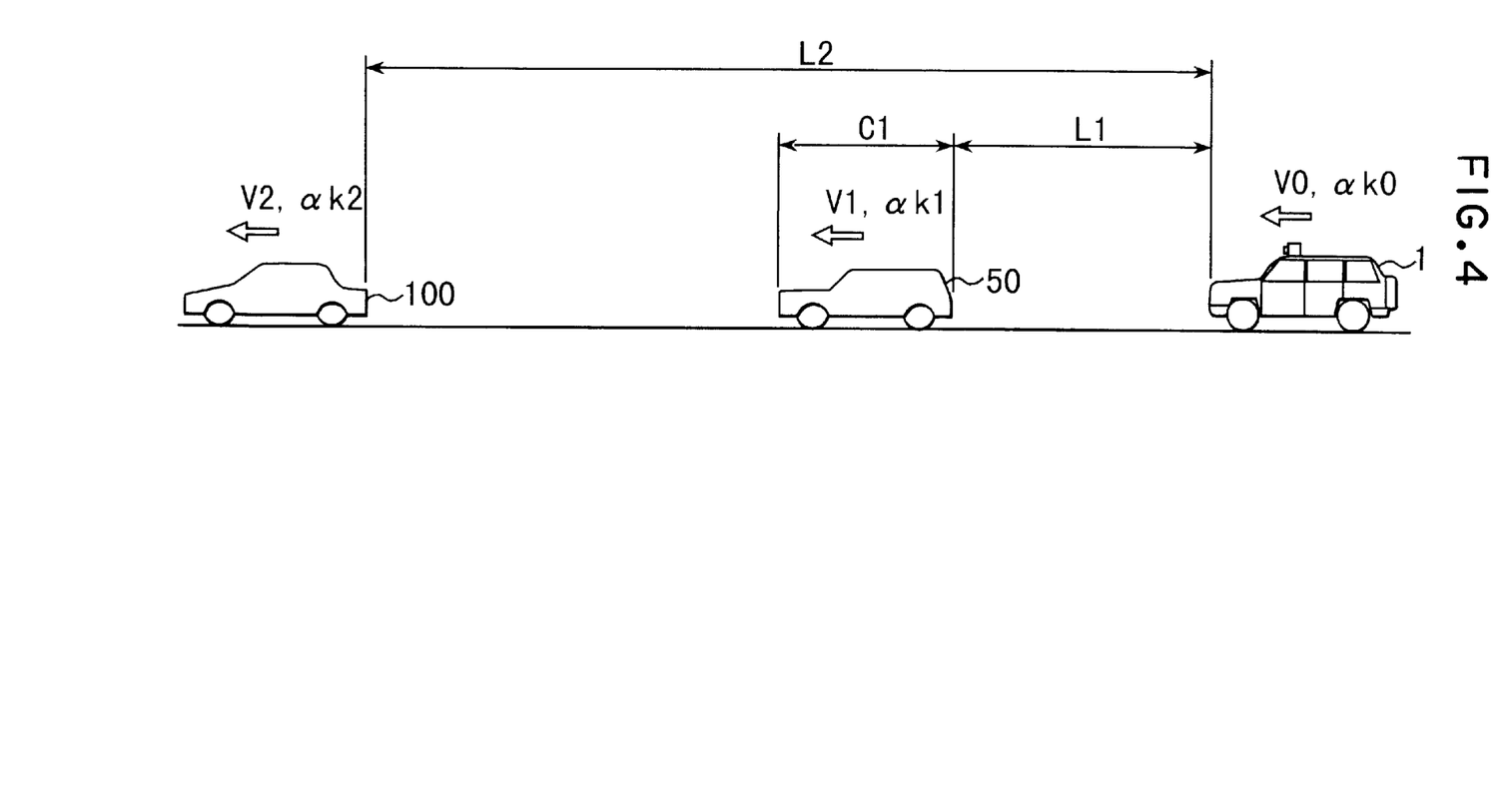
FIG. 4 is an explanatory view indicating a relationship between a self vehicle and a preceding vehicle and a relationship between a self vehicle and a next preceding vehicle.

Then, the program goes to S111 where a safe intervehicle distance LK2 between the subject vehicle and the preceding vehicle is calculated taking the existence of the next preceding vehicle into consideration. That is to say, as shown in FIG. 4, assuming such a situation that the driver of the preceding vehicle 50 makes an abnormal access to the next preceding vehicle 100 and applies an emergency brake or swerves the vehicle to avoid a collision, the safe inter-vehicle distance LK2 is calculated according to the following equation (4). In calculating the safe inter-vehicle distance LK2, the braking distance "$V1_{(n)}^2/(2\cdot\alpha_{k11})$" of the preceding vehicle 50 is replaced with the braking distance "$V2_{(n)}^2/(2\cdot\alpha_{k2})$" of the next preceding vehicle 100:

$$LK2=-V2_{(n)}^2/(2\cdot\alpha_{k2})+V0_{(n)}^2/(2\cdot\alpha_{k0})+V0_{(n)}\cdot T1+L0+C1 \quad (4)$$

where C1 is a body length of the preceding vehicle.

In this case, the paragraph "$V2_{(n)}^2/(2\cdot\alpha_{k2})$" which means the braking distance in the equation (4) is established to be 0 when the object detected ahead of the preceding vehicle is not a running vehicle but a parked vehicle or a pedestrian and the deceleration $\alpha_{k2}$ of the subject vehicle is established such that the paragraph "$V0_{(n)}^2/(2\cdot\alpha_{k0})+V0_{(n)}\cdot T1+L0+C1$" becomes smaller than the distance $L2_{(n)}$ from the subject vehicle to the object.

Next, the program goes from S111 to S112 where the present inter-vehicle distance $L1_{(n)}$ is compared with the safe inter-vehicle distance LK2 in a case where the next preceding vehicle exists. If the present inter-vehicle distance $L1_{(n)}$ is larger than the safe inter-vehicle distance LK2, the program skips to S107 where the present inter-vehicle distance $L1_{(n)}$ is compared with the safe inter-vehicle distance LK1 in a case where the next preceding vehicle does not exist. On the other hand, if the present inter-vehicle distance $L1_{(n)}$ is equal to or smaller than the safe inter-vehicle distance LK2 in case where the next preceding vehicle exists, a warning signal is outputted to the warning device 4 at S113 and the program leaves the routine.

Thus, according to the embodiment, even in such a case where the driver of the preceding vehicle does not take an appropriate inter-vehicle distance between his own vehicle and a vehicle running ahead of him and as a result he applies an emergency brake, the subject vehicle can be operated keeping a safe inter-vehicle distance between the subject vehicle and the preceding vehicle.

Figure 5:
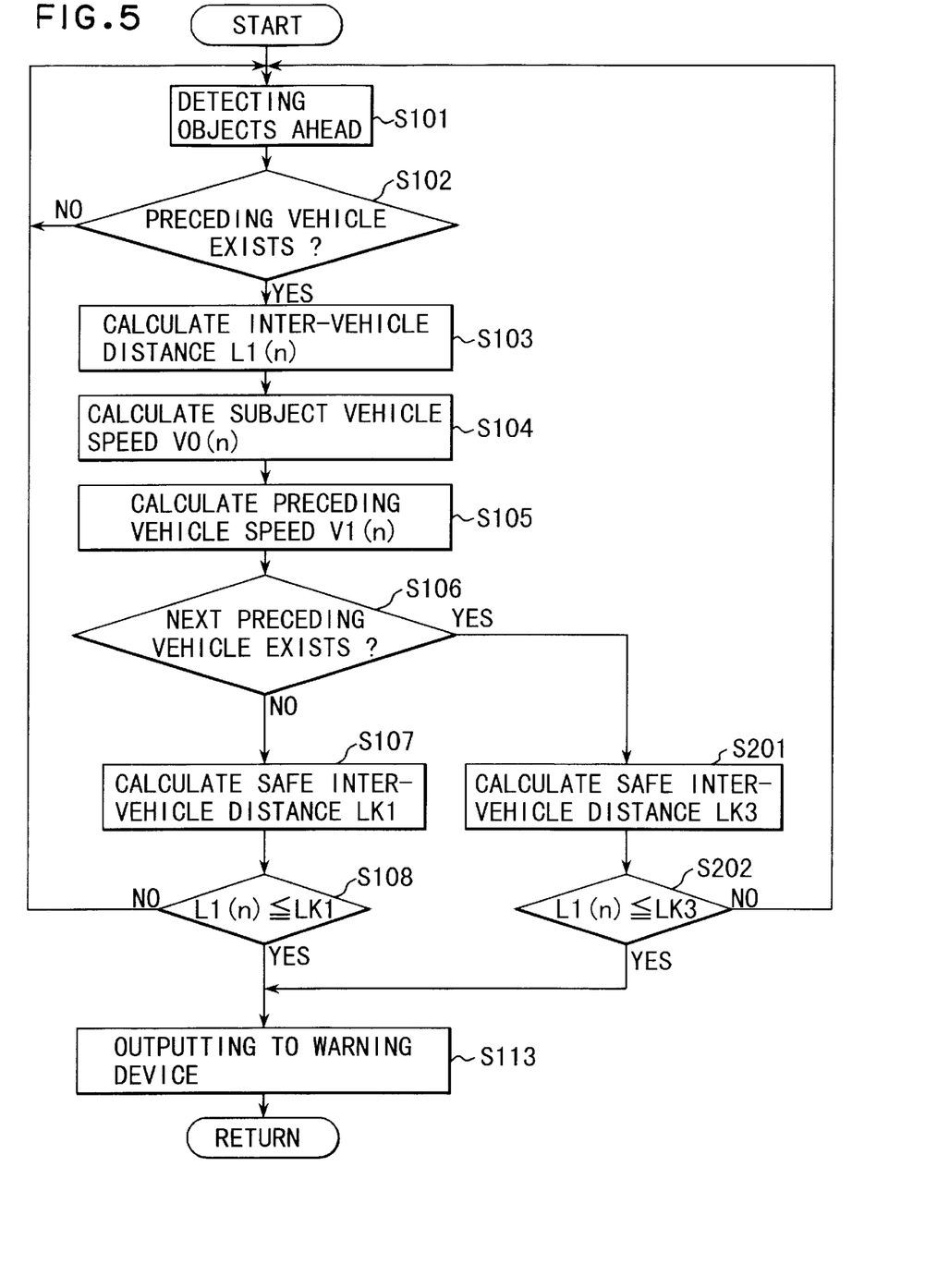
FIG. 5 is a flowchart showing a flow of control of a collision preventing apparatus according to a second embodiment of the present invention.

FIG. 5 is a flowchart showing a flow of control of a collision preventing apparatus according to a second embodiment. The feature of the second embodiment is that the safe inter-vehicle distance is calculated by taking a dead time due to the delay of hazard recognition of a driver of the preceding vehicle into consideration under such a situation as being unable to measure an accurate inter-vehicle distance between the subject vehicle and the next preceding vehicle.

That is to say, in case where the preceding vehicle is so huge that the visual fields of the CCD cameras 10a, 10b are blocked, only chance to recognize the next preceding vehicle is when these vehicles run on curved roads or when either of these gets out of the lane on the left or right side.

Accordingly, there is a case where it is impossible to measure an accurate distance to the next preceding vehicle although the next preceding vehicle is recognized ahead. Under this situation, the safe inter-vehicle distance L2 in case where the next preceding vehicle exists can not be used and another safe inter-vehicle distance must be prepared.

FIG. 5 is a flowchart corrected for this purpose and steps S109 to S112 of the first embodiment have been replaced with new steps S201 and S202.

Namely, when the next preceding vehicle is detected at S106, the program skips to S201 where a safe inter-vehicle distance LK3 is calculated according to the following equation (5) based on the vehicle speed $V0_{(n)}$ of the subject vehicle and the vehicle speed $V1_{(n)}$ of the preceding vehicle in consideration of the existence of the next preceding vehicle:

$$LK3=-V1_{(n)}^2/(2\cdot\alpha_{k12})+V0_{(n)}^2/(2\cdot\alpha_{k0})+V0_{(n)}\cdot(T1+T2)+L0 \quad (5)$$

In the above equation, T2 is a dead time of the preceding vehicle determined taking a delay of a driver's response time into consideration. Therefore, the paragraph "$V0_{(n)}\cdot(T1+T2)$" is an invalid running distance of the subject vehicle.

Further, the deceleration $\alpha_{k12}$ of the preceding vehicle may be established to be a value similar to the deceleration in case where there is no next preceding vehicle or alternatively it may be established to be a larger value on the safer side.

After the safe inter-vehicle distance LK3 is calculated at S201, the program goes to S202 where the safe inter-vehicle distance LK3 is compared with the present inter-vehicle distance $L1_{(n)}$. If the present inter-vehicle distance $L1_{(n)}$ is larger than the safe inter-vehicle distance LK3, the program returns to S101. If the present inter-vehicle distance $L1_{(n)}$ is equal to or smaller than the inter-vehicle distance LK3, the program goes to S113 where a warning signal is outputted to the warning device 4 and then the program leaves the routine.

Thus, according to this embodiment, since an adequate inter-vehicle distance is taken, an unexpected accident can be avoided even when a driver of the preceding vehicle having an insufficient inter-vehicle distance to the next preceding vehicle applies an emergency brake.

Figure 6:
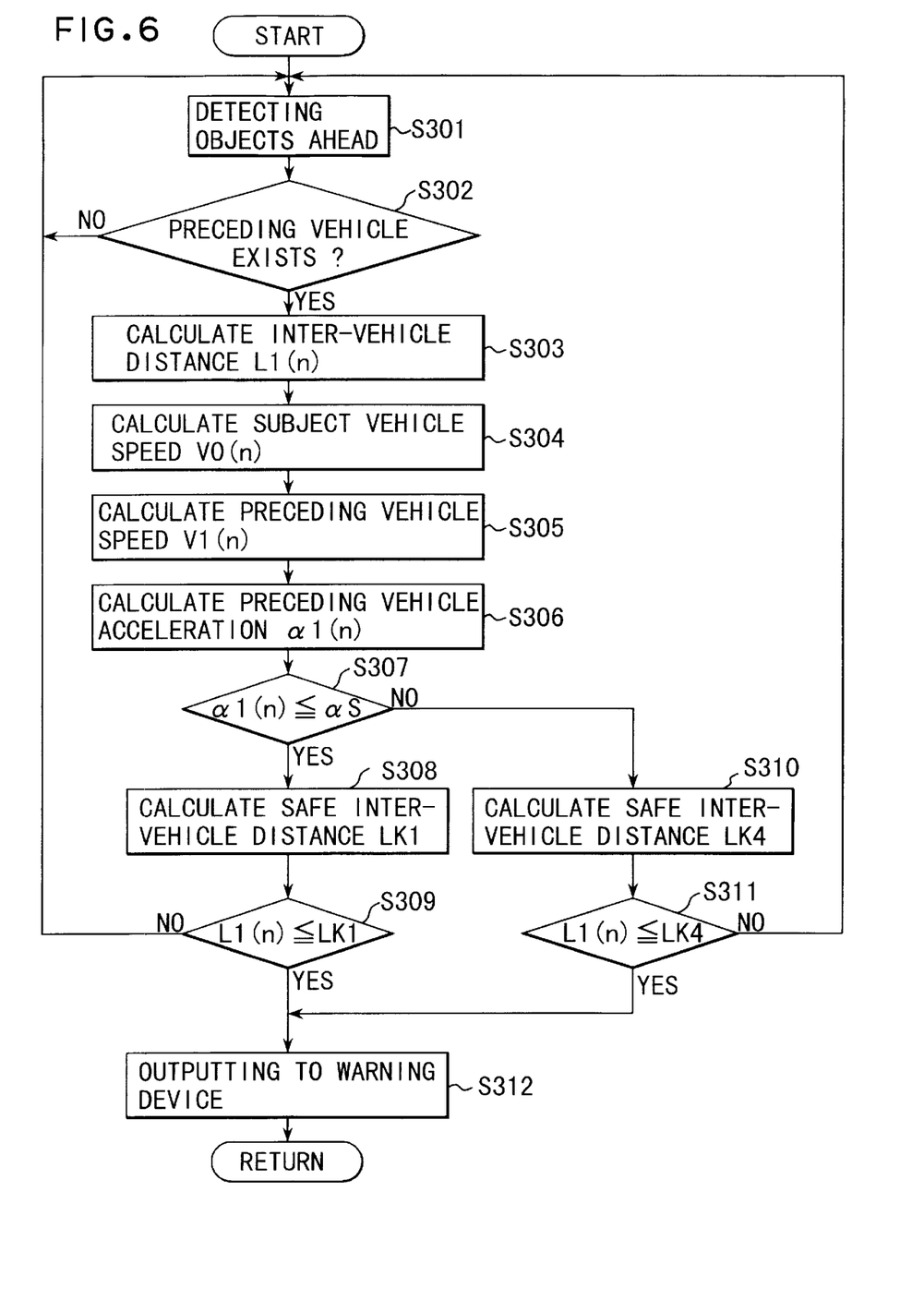
FIG. 6 is a flowchart showing a flow of control of a collision preventing apparatus according to a third embodiment of the present invention.

FIG. 6 is a flowchart showing a flow of control of the collision preventing apparatus according to a third embodiment. In this embodiment, the safe inter-vehicle distance is established according to the acceleration state of the preceding vehicle taking a delay of recognition or a delay of judgment of the driver of the subject vehicle into consideration.

In the flowchart of FIG. 6, steps S301 to S305 are the same steps as in the flowchart of FIG. 3. After the present vehicle speed $V1_{(n)}$ of the preceding vehicle is calculated, at S306 an acceleration $\alpha 1_{(n)}$ of the preceding vehicle is calculated in accordance with the following equation (6):

$$\alpha 1_{(n)} = (V1_{(n-1)} - V1_{(n)})/\Delta t \tag{6}$$

Then, the program steps to S307 where it is judged whether or not the present acceleration $\alpha 1_{(n)}$ of the preceding vehicle is smaller than a specified value as which is a threshold value for foreseeing hazard after the preceding vehicle is accelerated. When $\alpha 1_{(n)} \leq \alpha S$, the program goes from S307 to S308 where the safe inter-vehicle distance LK1 described is calculated according to the equation (2) of the first embodiment. That is to say, in this case, the safe inter vehicle distance takes the same value as in the case where the next preceding vehicle is not detected.

Further, the program goes to S309 where, as in the same manner as the first embodiment, the present inter-vehicle distance $L1_{(n)}$ is compared with the safe inter-vehicle distance LK1. If the present inter-vehicle distance $L1_{(n)}$ is larger than the safe inter-vehicle distance LK1, the program returns to the step S301. On the other hand, if the present inter-vehicle distance $L1_{(n)}$ is equal to or smaller than the safe inter-vehicle distance LK1, an alarm signal is outputted to the warning device 4 and the program leaves the routine.

When $\alpha 1_{(n)} > \alpha S$ at S307, the program is diverted from S307 to S310 where a safe inter-vehicle distance LK4 is calculated according to the following equation (7). The safe inter-vehicle distance LK4 is a distance value which is determined assuming a hazard when the preceding vehicle is decelerated suddenly after acceleration.

$$LK4 = -V1_{(n)}^2/(2 \cdot \alpha_{k13}) + V0_{(n)}^2/(2 \cdot \alpha_{k0}) + V0_{(n)} \cdot (T1 + \Delta T) + L0 \tag{7}$$

In the equation (7), $\Delta T$ is a dead time taking account of a belief of the driver of the subject vehicle. Generally, the driver tends to believe it to be safe when the preceding vehicle starts to be accelerated, although there is a possibility that the preceding vehicle may be braked suddenly to avoid a collision with obstacles or to make a turn to the left or right. Under these situations, it takes a some amount of time until the driver notices hazard and starts to depress the brake pedal for avoiding hazard. Accordingly, the paragraph "$V0_{(n)} \cdot (T1 + \Delta T)$" is an invalid running distance when taking this "driver's belief" into consideration. Further, the paragraph "$V1_{(n)}^2/(2 \cdot \alpha_{k13})$" is a braking distance of the preceding vehicle when a brake is applied with a deceleration $\alpha_{k13}$ at the vehicle speed V1(n) and the paragraph "$V0_{(n)}^2/(2 \cdot \alpha_{k0})$" is a braking distance of the subject vehicle when a brake is applied with a deceleration $\alpha_{k0}$ at the vehicle speed $V0_{(n)}$.

The dead time $\Delta T$ may be varied according to the vehicle speed $V1_{(n)}$ of the preceding vehicle, the vehicle speed $V0_{(n)}$ of the subject vehicle, the acceleration $\alpha_{(n)}$ of the preceding vehicle and the like. Further, the deceleration $\alpha_{k13}$ may be established to be a large value in place of introducing the dead time $\Delta T$.

After calculating the safe inter-vehicle distance LK4 at S311, the program goes to S311 where it is judged whether or not the present inter-vehicle distance $L1_{(n)}$ is compared with the safe inter-vehicle distance LK4. If the present inter-vehicle distance $L1_{(n)}$ is larger than the safe inter-vehicle distance LK4, the program returns to S301 and If the present inter-vehicle distance $L1_{(n)}$ is equal to or smaller than the safe inter-vehicle distance LK4, the program goes to S312 where a warning signal is outputted to the warning device 4 and leaves the routine.

Since the collision preventing apparatus according to the embodiment allows the vehicle to have a safe inter-vehicle distance in case for an emergency brake of the preceding vehicle, it is effective especially when the subject vehicle repeats a stop-and-go or with a short inter-vehicle distance to the preceding vehicle. Further the collision preventing apparatus is also effective when those vehicles run at low speeds with a short inter-vehicle distance, because in situations like these accidents tend to occur frequently.

Further, the embodiments described hereinbefore have exemplified the collision preventing apparatus having stereoscopic cameras for imaging objects ahead of the subject vehicle, however as alternative modes of the invention, in place of the stereoscopic cameras, a scanning type laser beam-radar or the combination of the scanning type laser beam-radar and a single-eye camera may be employed to recognize objects.

In summary, according to the present invention, since the collision preventing apparatus is constituted such that the inter-vehicle distance between the self vehicle and the preceding vehicle is calculated is compared with the safe inter-vehicle distance calculated in conjunction with situations ahead of the preceding vehicle as well as the preceding vehicle and based on the result of the comparison it is judged whether or not the self vehicle has a possibility of collision with the preceding vehicle, not only the vehicle can obtain an overall safety with regard to a plurality of objects ahead such as the preceding vehicle and the next preceding vehicle, but also the vehicle can enjoy a smooth and safe driving without disturbing a stream of traffics.

While the presently preferred embodiments of the present invention have been shown and described, it is to be understood that these disclosures are for the purpose of illustration and that various changes and modifications may be made without departing from the scope of the invention as set forth in the appended claim.

What is claimed is:

1. A collision preventing apparatus of a subject vehicle for preventing collision with a preceding vehicle which is traveling in front of said subject vehicle, comprising:

actual inter-vehicle distance detecting means for detecting a first actual inter-vehicle distance between said subject vehicle and said preceding vehicle and a second actual inter-vehicle distance between said subject vehicle and an object existing ahead of said preceding vehicle;

safe inter-vehicle distance calculating means for calculating a first safe inter-vehicle distance between said subject vehicle and said preceding vehicle and a second safe inter-vehicle distance between said subject vehicle and said object, in accordance with a braking distance and a dead time before braking of said subject vehicle; and hazard judging means for judging a hazard of collision of said subject vehicle with said preceding vehicle in the case that said second actual inter-vehicle distance becomes smaller than said second safe inter-vehicle distance even when said first actual inter-vehicle distance is larger than said safe inter-vehicle distance.

2. A collision preventing apparatus of a subject vehicle for preventing a collision with a preceding vehicle which is traveling in front of said subject vehicle, comprising:

actual inter-vehicle distance detecting means for detecting an actual inter-vehicle distance between said subject vehicle and said preceding vehicle;

safe inter-vehicle distance calculating means for alternatively calculating a first safe inter-vehicle distance and a second safe inter-vehicle distance between said subject vehicle and said preceding vehicle, depending on whether an object exists ahead of said preceding vehicle, said second safe inter-vehicle distance being calculated taking account of a dead time before braking of said preceding vehicle in addition to a braking distance and a dead time before braking of said subject vehicle which are used to calculate said first safe inter-vehicle distance; and hazard judging means for judging a hazard of collision of said subject vehicle with said preceding vehicle in the case that said actual inter-vehicle distance becomes smaller than alternatively one of said first and second safe inter-vehicle distances.

3. A collision preventing apparatus of a subject vehicle for preventing a collision with a preceding vehicle which is traveling in front of said subject vehicle, comprising:

actual inter-vehicle distance detecting means for detecting an actual inter-vehicle distance between said subject vehicle and said preceding vehicle;

safe inter-vehicle distance calculating means for alternatively calculating a first safe inter-vehicle distance and a second safe inter-vehicle distance between said subject vehicle and said preceding vehicle, depending on whether the magnitude of acceleration of said preceding vehicle exceeds a threshold value, said second safe inter-vehicle distance being set longer than said first safe inter-vehicle distance; and hazard judging means for judging a hazard of collision of said subject vehicle with said preceding vehicle in the case that said actual inter-vehicle distance becomes smaller than alternatively one of said first and second safe inter-vehicle distances.

* * * * *